(No Model.)
W. CLAYTON.
AUTOMATIC CAR BRAKE.
No. 315,125. Patented Apr. 7, 1885.
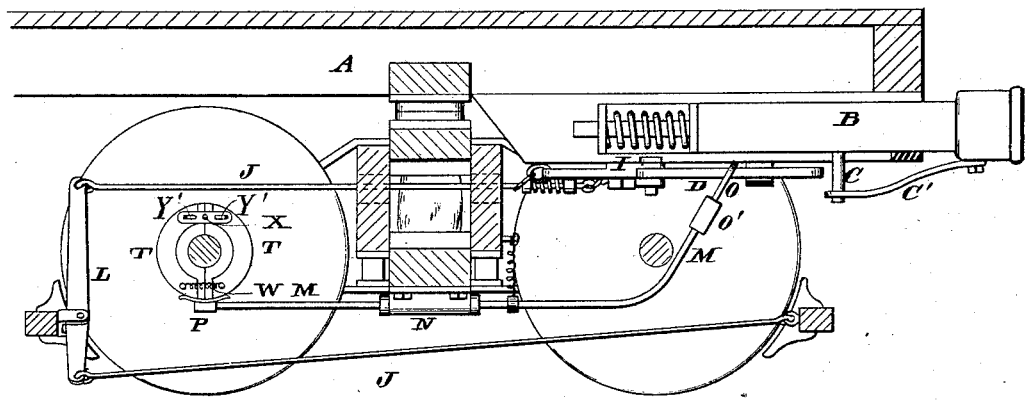
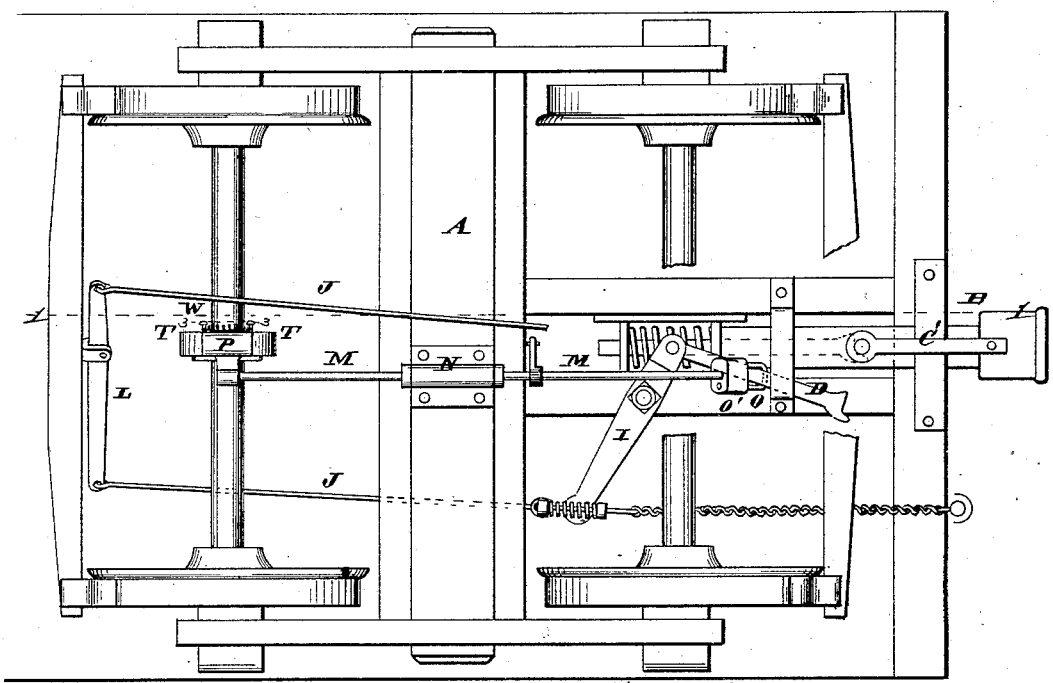
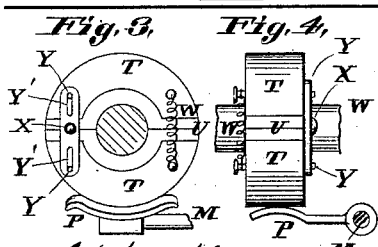 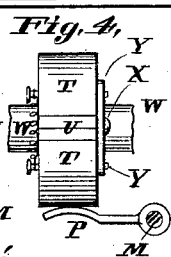 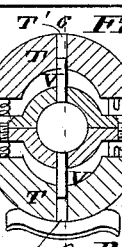 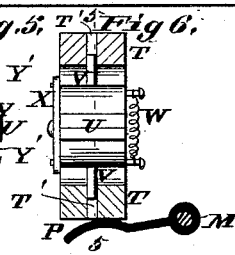 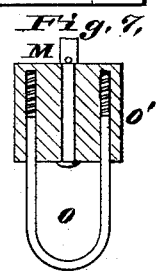
Attest:
Victor A. Lewis
Geo. L. Wheelock
Inventor:
Wm. Clayton
By Knight Bros
Attys.
N. PETERS, Photo-Lithographer, Washington, D. C.

UNITED STATES PATENT OFFICE.

WILLIAM CLAYTON, OF ST. LOUIS, MISSOURI.

AUTOMATIC CAR-BRAKE.

SPECIFICATION forming part of Letters Patent No. 315,125, dated April 7, 1885.

Application filed February 11, 1885. (No model.)

*To all whom it may concern:*

Be it known that I, WILLIAM CLAYTON, of the city of St. Louis, in the State of Missouri, have invented a certain new and useful Improvement in Automatic Car-Brakes, of which the following is a full, clear, and exact description, reference being had to the accompanying drawings, forming part of this specification, and in which—

Figure 1 is a vertical section taken on line 1 1, Fig. 2, illustrating my improved brake. Fig. 2 is a bottom view of one end of a car-truck with my improvement applied. Fig. 3 is a section of the governor-axle taken on line 3 3, Fig. 2, showing the governor in side view, enlarged. Fig. 4 is an edge view of the governor, showing part of the axle, rock-shaft, and arm. Fig. 5 is a section taken on line 5 5, Fig. 6, showing the governor open. Fig. 6 is a section taken on line 6 6, Fig. 5. Fig. 7 is a section taken on line 7 7, Fig. 1, showing the yoke or staple that connects the rock-shaft to the push-bar.

My present invention relates to an improvement on my Patent No. 289,982, issued December 11, 1883; and my present invention consists in features of novelty hereinafter fully described, and pointed out in the claims.

Referring to the drawings, A represents one end of a car and truck.

B is the draw-bar, provided, as in my said patent, with a pin, C, that comes against one end of a push-bar, D, to apply the brakes, the inner end of the bar being made fast to one end of a lever, I, the other end of which is connected by rods J and lever L to the brake-beams. The pin C may be strengthened by a brace, C'.

M represents the rock-shaft O of said patent supported by a box, N, secured to the truck.

My present invention consists in the manner of connecting the shaft to the push-bar, and in the manner of rocking it from the device secured to the axle, whereby the bar is pushed or moved over in front of the pin by the movement of the car, as in the patent. It (the shaft) is secured to the bar by a yoke or staple, O, (see Fig. 7,) made fast in a block, O', to which the end of the shaft is secured. This arrangement allows the bar free play, and the rock-shaft does not bind against it in working.

P represents an arm or plate made fast to the inner end of the shaft, and extending beneath the device that operates the shaft, which consists of two segments, T, or a thick ring divided in two parts held to plates U, secured to one of the axles of the truck by pins V, made fast to the plates, and extending through slots or openings T' in the segments. The two segments are connected by spiral springs W, which hold them closed against the plates U when the car is not in motion, (see Figs. 3 and 4,) but which allow them to expand, as shown in Figs. 5 and 6, when the car attains a certain speed, and as they expand they depress the free end of the plate or arm P and rock the shaft M, thereby moving the push-bar over in front of the pin on the draw-bar, (see dotted lines, Fig. 2,) so that the inward movement of the draw-bar, when the engine is reversed, will apply the brakes, as in said patent. The segments may also be connected by bars X, secured to the plates U, and having slots Y', in which fit pins Y on the segments.

When the shaft is rocked as above described and the train has stopped, the shaft is returned to its normal position by a spring, Z', connecting an arm, Z, on the shaft to the truck.

I claim as my invention—

1. The combination of the draw-bar provided with a pin or projection, push-bar connected to the brake-beams, rock-shaft provided with an arm and connected to the push-bar by a yoke and block, and expansible segments secured to one of the axles of the truck and adapted to bear against the arm on the rock-shaft, substantially as set forth.

2. The combination of the draw-bar provided with a pin or projection, push-bar connected to the brake-beams, rock-shaft provided with an arm and connected to the push-bar, and segments for operating the parts secured to one of the axles by plates and pins, and being connected by springs, substantially as set forth.

3. The combination of the draw-bar provided with a pin or projection, push-bar connected to the brake-beams, rock-shaft connected to the push-bar, arm on the rock-shaft, plates secured to one of the axles, pins projecting from the plates, segments having perforations to receive the pins on the plates, springs connecting the segments, and bars secured to said plates and slotted to receive pins on the segments, all arranged and operating substantially as shown and described, for the purpose set forth.

WILLIAM CLAYTON.

In presence of—
 Geo. H. Knight,
 Saml. Knight.